United States Patent
Deng

(10) Patent No.: US 11,137,526 B2
(45) Date of Patent: Oct. 5, 2021

(54) HEAD-MOUNTED DISPLAY

(71) Applicant: HTC Corporation, Taoyuan (TW)

(72) Inventor: Qing-Long Deng, Taoyuan (TW)

(73) Assignee: HTC Corporation, Taoyuan (TW)

(*) Notice: Subject to any disclaimer, the term of this patent is extended or adjusted under 35 U.S.C. 154(b) by 216 days.

(21) Appl. No.: 16/592,782

(22) Filed: Oct. 4, 2019

(65) Prior Publication Data
US 2020/0110198 A1 Apr. 9, 2020

Related U.S. Application Data

(60) Provisional application No. 62/741,552, filed on Oct. 5, 2018.

(51) Int. Cl.
| | |
|---|---|
| *G02B 3/08* | (2006.01) |
| *G02B 3/00* | (2006.01) |
| *G02B 27/00* | (2006.01) |
| *G06F 1/16* | (2006.01) |

(52) U.S. Cl.
CPC ....... *G02B 3/0056* (2013.01); *G02B 27/0075* (2013.01); *G02B 2003/0093* (2013.01); *G06F 1/163* (2013.01)

(58) Field of Classification Search
CPC .............. G02B 3/0056; G02B 27/0075; G02B 2003/0093; G02B 30/10; G02B 2027/0123; G02B 2027/0134; G02B 2027/0178; G02B 27/0172; G02B 3/0037; G06F 1/163
See application file for complete search history.

(56) References Cited

U.S. PATENT DOCUMENTS

| | | | |
|---|---|---|---|
| 2015/0159828 A1* | 6/2015 | Joergensen | F21V 5/007 362/235 |
| 2017/0171533 A1* | 6/2017 | Benitez | G02B 30/27 |
| 2018/0210208 A1 | 7/2018 | Zhou et al. | |

FOREIGN PATENT DOCUMENTS

| | | |
|---|---|---|
| CN | 103823305 A | 5/2014 |
| CN | 105717640 A | 6/2016 |
| CN | 106464861 A | 2/2017 |
| CN | 206270594 U | 6/2017 |
| CN | 107209381 A | 9/2017 |
| WO | 2018023987 A1 | 2/2018 |

OTHER PUBLICATIONS

Corresponding European search report dated Feb. 5, 2020.
Corresponding Taiwan office action dated Dec. 12, 2019.
Corresponding Chinese office action dated May 26, 2021.

\* cited by examiner

*Primary Examiner* — James C. Jones
(74) *Attorney, Agent, or Firm* — CKC & Partners Co., LLC

(57) ABSTRACT

A head-mounted display includes an optical component. The optical component includes a plurality of micro lenses and a central lens. The micro lenses are connected to each other. The central lens is connected among and surrounded by the micro lenses. The central lens and the micro lenses are substantially arranged along a plane.

10 Claims, 5 Drawing Sheets

HEAD-MOUNTED DISPLAY

CROSS-REFERENCE TO RELATED APPLICATION

This application claims priority to U.S. Provisional Application Ser. No. 62/741,552, filed on Oct. 5, 2018, which is herein incorporated by reference.

BACKGROUND

Technical Field

The present disclosure relates to a head-mounted display.

Description of Related Art

One of the rapidly growing technologies in the field of human-computer interaction is various head-mounted displays (HMDs), which may be worn on a user's head and have one or two displays in front of the user's eyes. This type of display has multiple commercial applications involving simulation of virtual reality including video games, medicine, sport training, entertainment applications, and so forth. In the gaming field, these displays may be used, for example, to render three-dimensional (3D) virtual game worlds.

For a head-mounted display, there is a need for the optical system to have a wide field of view (FOV), e.g., greater than 120 degrees. The wide field of view increases the sense of immersion and allows the users to observe mobile object better. The development of a wide FOV head mounted display has been a technological challenge for decades. Some kinds of conventional head-mounted displays tackled this problem using multiple display units (tiling) or multiple curved mirrors. However, the former approach tends to be expensive and heavy, whereas the latter approach tends to suffer from image distortion and a small exit pupil. There is also a kind of conventional head-mounted display tackled this problem using a curved Fresnel lens. However, the manufacturing accuracy of the curved Fresnel lens is hard to control, and optical aberration and stray light are easily produced while using the curved Fresnel lens.

Accordingly, it is an important issue for the industry to provide a head-mounted display capable of solving the aforementioned problems.

SUMMARY

An aspect of the disclosure is to provide a head-mounted display that can efficiently solve the aforementioned problems.

According to an embodiment of the disclosure, a head-mounted display includes an optical component. The optical component includes a plurality of micro lenses and a central lens. The micro lenses are connected to each other. The central lens is connected among and surrounded by the micro lenses. The central lens and the micro lenses are substantially arranged along a plane.

In an embodiment of the disclosure, the central lens and the micro lenses of the optical component form a unitary lens structure.

In an embodiment of the disclosure, a lateral length of the central lens is greater than a lateral length of any of the micro lenses. The lateral lengths are measured along one dimension of the plane.

In an embodiment of the disclosure, the lateral length of the central lens is about 4 to 50 times the lateral length of any of the micro lenses.

In an embodiment of the disclosure, a shape of a peripheral edge of the central lens is substantially circular.

In an embodiment of the disclosure, a shape of a peripheral edge of one of the micro lenses is at least a part of a hexagon.

In an embodiment of the disclosure, the head-mounted display further includes a display panel having a display surface. The display surface faces the optical component.

In an embodiment of the disclosure, the display surface includes a central display region and a peripheral display region surrounding the central display region. The central lens has an optical axis passing through the central display region.

In an embodiment of the disclosure, the display panel is configured to display a central image at the central display region and a plurality of light field images at the peripheral display region.

In an embodiment of the disclosure, the display surface is a flat surface.

In an embodiment of the disclosure, the display surface is a concave surface.

In an embodiment of the disclosure, one of the micro lenses that is directly connected to the central lens is smoothly connected to a peripheral edge of the central lens.

Accordingly, the head-mounted display of the present disclosure provides an optical component combining a central lens and a plurality of micro lenses to widen the field of view. The optical component is cheap and light, and well-known problems (e.g., image distortion, small exit pupil, optical aberration, stray light, etc.) can be effectively solved. In addition, the micro lenses can be used to present the depth effect of light field, such that the sense of immersion can be further enhanced by the depth effect.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
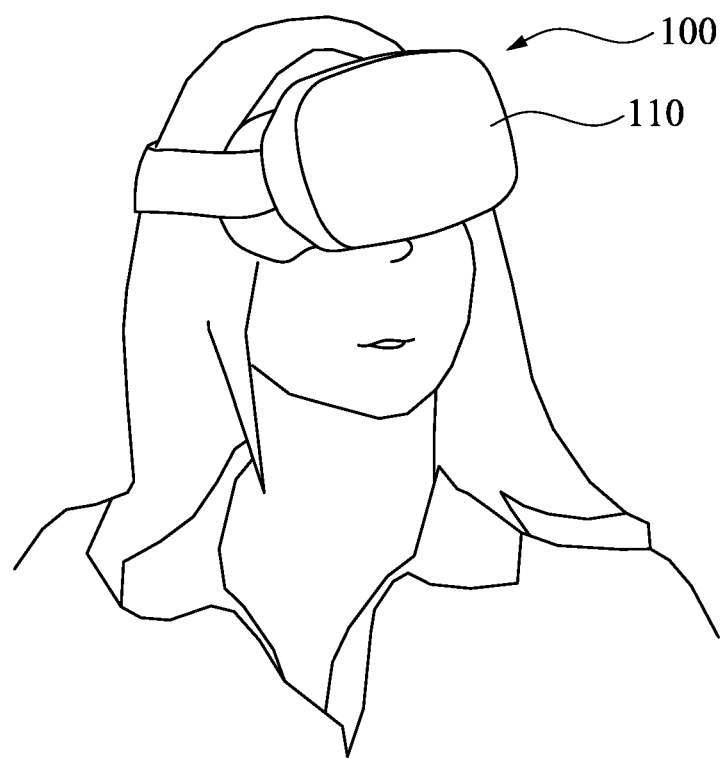
FIG. 1 is a schematic diagram illustrating a user wearing a head-mounted display according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Reference is made to FIG. 1. FIG. 1 is a schematic diagram illustrating a user wearing a head-mounted display 100 according to some embodiments of the present disclosure. As shown in FIG. 1, the head-mounted display 100 includes a housing 110 configured to be worn on the head of the user. In some embodiments, the head-mounted display 100 may communicate wirelessly (e.g., WiFi, Bluetooth, etc.) with a computing device. In some embodiments, the head-mounted display 100 may be wired directly to the computing device or in communication with the computing device via a network (e.g., the Internet). For example, the computing device may be a server on a network that provides video or game services. In some embodiments, the head-mounted display 100 is a game playing device and the game is executed directly on the head-mounted display, without the need of an external device to run the game.

Figure 2:
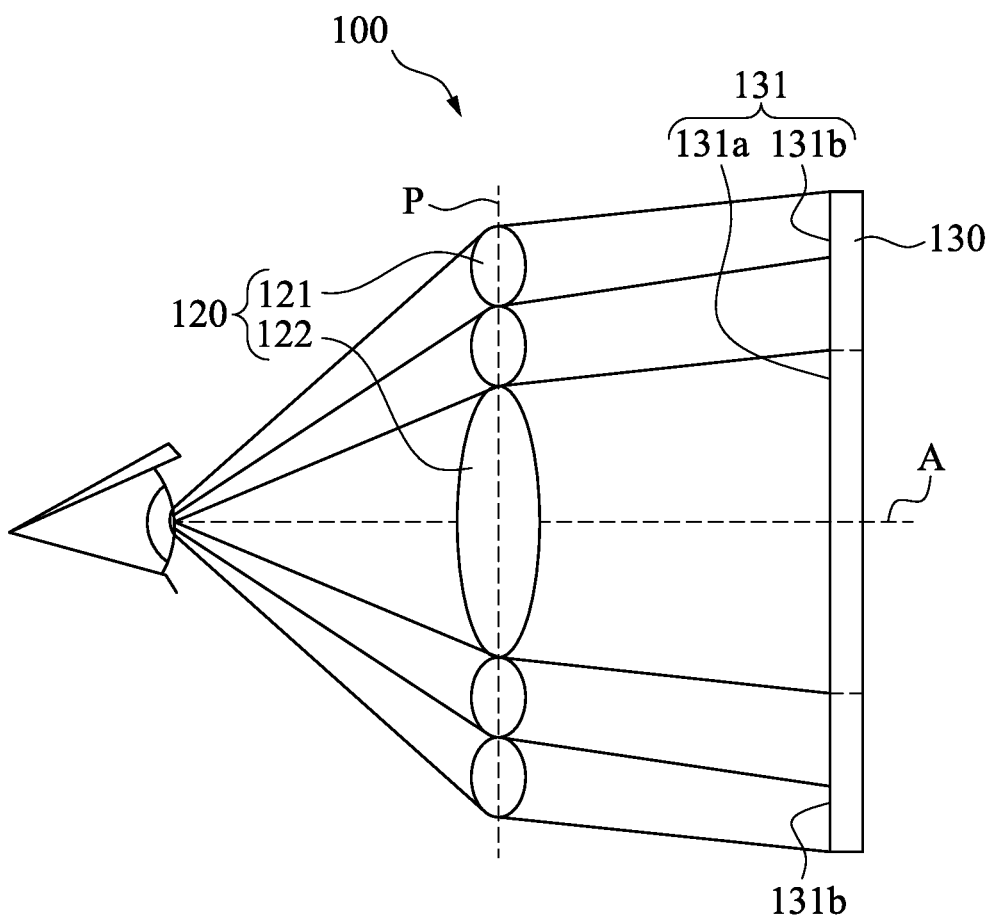
FIG. 2 is a schematic view of components of the head-mounted display according to some embodiments of the present disclosure.

Reference is made to FIG. 2. FIG. 2 is a schematic view of components of the head-mounted display 100 according to some embodiments of the present disclosure. As shown in FIG. 2, the head-mounted display 100 further includes an optical component 120 and a display panel 130. The optical component 120 and the display panel 130 are disposed on the housing 110. The display panel 130 is configured to display images. The optical component 120 is configured to transmit the images to an eye of the user.

Figure 3:
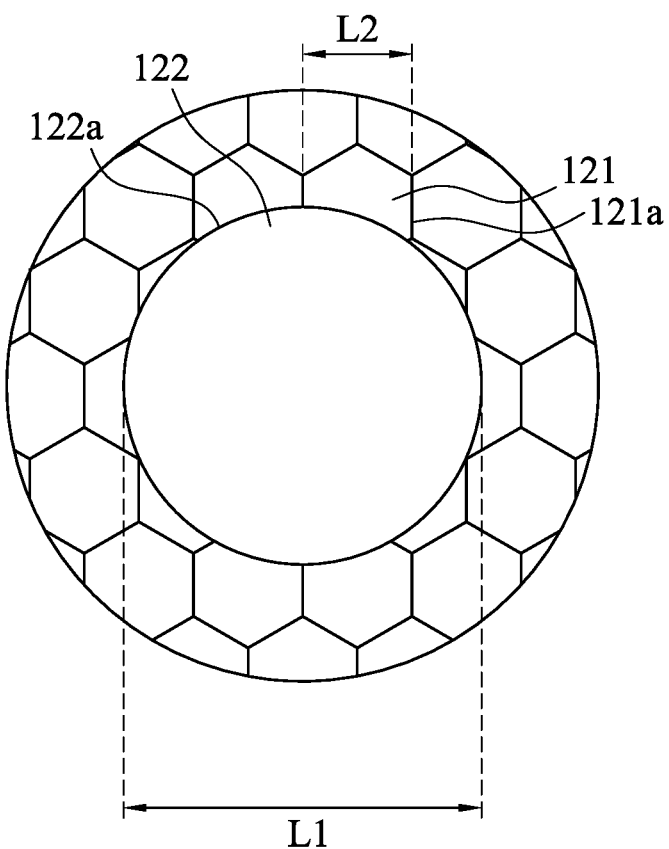
FIG. 3 is a front view of an optical component as shown in FIG. 2 according to some embodiments of the present disclosure.

Reference is made to FIG. 3. FIG. 3 is a front view of the optical component 120 as shown in FIG. 2 according to some embodiments of the present disclosure. As shown in FIGS. 2 and 3, the optical component 120 includes a plurality of micro lenses 121 and a central lens 122. The micro lenses 121 are connected to each other. The central lens 122 is connected among and surrounded by the micro lenses 121. The central lens 122 and the micro lenses 121 are substantially arranged along a plane P. That is to say, the micro lenses 121 and the central lens 122 are connected side by side.

In some embodiments, as shown in FIG. 2, the display panel 130 has a display surface 131. The display surface 131 faces the optical component 120. The display surface 131 includes a central display region 131a and a peripheral display region 131b surrounding the central display region 131a. The central lens 122 has an optical axis A passing through the central display region 131a. The object distance of the central lens 122 corresponds to the central display region 131a, and the object distances of the micro lenses 121 correspond to the peripheral display region 131b. As such, the central lens 122 is configured to magnify the image content displayed in the central display region 131a and present a high-resolution virtual image, while the micro lenses 121 are configured to magnify the image content displayed in the peripheral display region 131b and present a virtual image with a lower resolution. In some embodiments, the central lens 122 adopts a surface design, which has a high resolution and is designed to meet the high resolution requirements of the central field of view. Although the resolution of the surrounding micro lenses 121 is not as high as that of the central lens 122, it can meet the low resolution requirements of the peripheral field of view.

Figure 4:
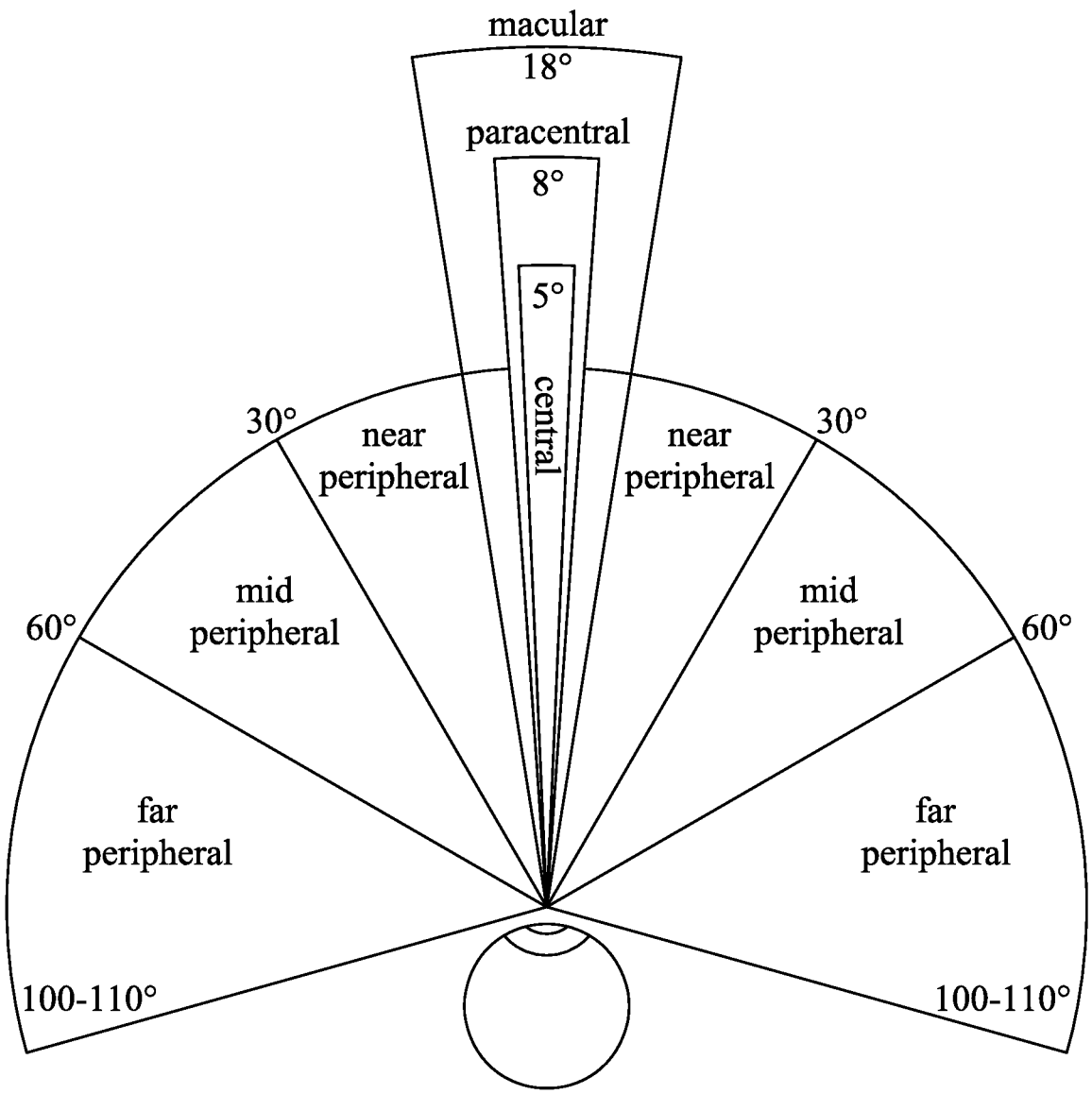
FIG. 4 is a schematic diagram illustrating a human field of view (FOV)

Reference is made to FIG. 4. FIG. 4 is a schematic diagram illustrating a human field of view (FOV). According to visual physiology, the macular portion located in the retina has the highest sensitivity to color vision, and thus has the greatest resolution for images. As can be seen from the range of angle of view shown in FIG. 4, the angle of view corresponding to the central region (i.e., the fovea) of the macular portion is about 5 degrees, and the peripheral region of the macular portion is from about 8 degrees to about 18 degrees. In the portion of the retina other than the macular portion, the color vision sensitivity is lower, and the corresponding angle of view ranges from about 18 degrees to about 60 degrees, and even the maximum angle of view can reach about 110 degrees. That is to say, when the human eye is watching the external environment, the central field of view (about ±30 degrees relative to the viewing direction) is the clearest, and the peripheral field of view is more blurred and unclear. It should be pointed out that due to physiological limitations, the angle of rotation of the human eye is about 60 degrees. The central lens 122 covers a field of view of about 120 degrees, so it is sufficient to meet the resolution requirements of the central field of view of the human eye.

In some embodiments, the central lens 122 and the micro lenses 121 of the optical component 120 form a unitary lens structure. For example, the optical component 120 may be made of a transparent plastic by an injection molding process, but the disclosure is not limited in this regard.

In some embodiments, a lateral length L1 of the central lens 122 is greater than a lateral length L2 of any of the micro lenses 121. The lateral lengths L1, L2 are measured along one dimension of the plane P. In some embodiments, the lateral length L1 of the central lens 122 is about 4 to 50 times the lateral length L2 of any of the micro lenses 121. For example, the lateral length L1 of the central lens 122 is from about 40 mm to about 50 mm, and the lateral length L2 of any of the micro lenses 121 is from about 1 mm to 10 mm, but the disclosure is not limited in this regard.

In some embodiments, as shown in FIG. 3, a shape of a peripheral edge 122a of the central lens 122 is substantially circular, but the disclosure is not limited in this regard. In some embodiments, as shown in FIG. 3, a shape of a peripheral edge 121a of each of the micro lenses 121 is at least a part of a hexagon, such that the micro lenses 121 can be stacked along the plane P more closely, but the disclosure is not limited in this regard.

In some embodiments, the display panel 130 is configured to display the same type of image at the central display region 131a and the peripheral display region 131b, but the disclosure is not limited in this regard. In some other embodiments, the display panel 130 is configured to display a central image at the central display region 131a and a plurality of light field images at the peripheral display region 131b. As such, the micro lenses 121 can be used to present the depth effect of light field, such that the sense of immersion can be further enhanced by the depth effect.

Figure 5:
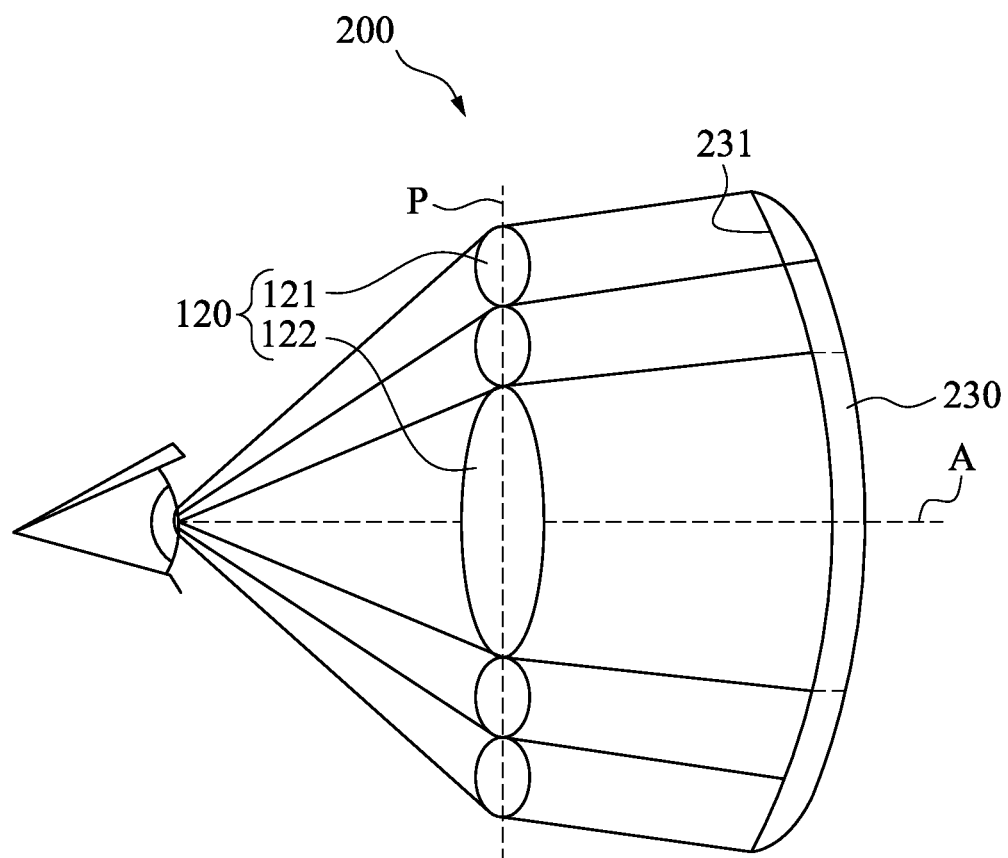
FIG. 5 is a schematic view of components of a head-mounted display according to some embodiments of the present disclosure.

As shown in FIG. 2, display surface 131 of the display panel 130 is a flat surface, but the disclosure is not limited in this regard. Reference is made to FIG. 5. FIG. 5 is a schematic view of components of a head-mounted display 200 according to some embodiments of the present disclosure. Compared to the embodiments as shown in FIG. 2, the display panel 230 of the embodiments as shown in FIG. 5 has a display surface 231 which is a concave surface. That is to say, the display panel 230 is a curved panel or a freeform panel. By designing the display surface 231 as a concave surface, the head-mounted display 200 can provide a larger field of view with the same panel width and effectively solve the problems of field curvature aberration and distortion aberration.

In some embodiment, the micro lenses 121 that are directly connected to the central lens 122 are smoothly connected to a peripheral edge 122a of the central lens 122. Furthermore, by adjusting the curvatures of the central lens 122 and the micro lenses 121 directly connected thereto, the purpose of eliminating the sense of discontinuity in the displayed image as mentioned above can also be achieved.

According to the foregoing recitations of the embodiments of the disclosure, it can be seen that the head-mounted display of the present disclosure provides an optical component combining a central lens and a plurality of micro lenses to widen the field of view. The optical component is cheap and light, and well-known problems (e.g., image distortion, small exit pupil, optical aberration, stray light, etc.) can be effectively solved. In addition, the micro lenses can be used to present the depth effect of light field, such that the sense of immersion can be further enhanced by the depth effect.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A head-mounted display, comprising:
    an optical component comprising:
        a plurality of micro lenses connected to each other; and
        a central lens connected among and surrounded by the micro lenses, wherein the central lens and the micro lenses are substantially arranged along a plane; and
    a display panel having a display surface facing the optical component, the display surface comprising a central display region and a peripheral display region surrounding the central display region, wherein the display panel is configured to display a central image at the central display region and a plurality of light field images at the peripheral display region.

2. The head-mounted display of claim 1, wherein the central lens and the micro lenses of the optical component form a unitary lens structure.

3. The head-mounted display of claim 1, wherein a lateral length of the central lens is greater than a lateral length of any of the micro lenses, and the lateral lengths are measured along one dimension of the plane.

4. The head-mounted display of claim 3, wherein the lateral length of the central lens is about 4 to 50 times the lateral length of any of the micro lenses.

5. The head-mounted display of claim 1, wherein a shape of a peripheral edge of the central lens is substantially circular.

6. The head-mounted display of claim 1, wherein a shape of a peripheral edge of one of the micro lenses is at least a part of a hexagon.

7. The head-mounted display of claim 1, wherein the central lens has an optical axis passing through the central display region.

8. The head-mounted display of claim 1, wherein the display surface is a flat surface.

9. The head-mounted display of claim 1, wherein the display surface is a concave surface.

10. The head-mounted display of claim 1, wherein one of the micro lenses that is directly connected to the central lens has a surface smoothly connected to a surface of the central lens.

* * * * *